United States Patent [19]

Edgington

[11] 4,095,456
[45] Jun. 20, 1978

[54] APPARATUS FOR INDICATING RATE OF ICE ACCRETION

[75] Inventor: Geoffrey Edgington, Godalming, England

[73] Assignee: Lucas Industries Limited, Birmingham, England

[21] Appl. No.: 690,389

[22] Filed: May 27, 1976

[30] Foreign Application Priority Data

Jun. 4, 1975 United Kingdom ............ 24068/75

[51] Int. Cl.$^2$ .......................................... G01B 13/04
[52] U.S. Cl. ................................. 73/37.6; 244/134 F
[58] Field of Search ............ 73/37, 37.5, 37.6, 37.7, 73/432 CR; 340/234; 137/81; 244/134 F

[56] References Cited

U.S. PATENT DOCUMENTS

| | | | |
|---|---|---|---|
| 2,171,450 | 8/1939 | Langley | 244/134 F X |
| 2,427,778 | 9/1947 | Gregg | 244/134 F |
| 2,585,604 | 2/1952 | Vonnegut et al. | 340/234 X |
| 2,953,917 | 9/1960 | Kirk | 73/37.5 |
| 3,220,244 | 11/1965 | Donnelly | 73/37.6 |
| 3,252,470 | 5/1966 | Elly et al. | 137/81 X |
| 3,385,076 | 5/1968 | Edwards | 73/37.5 X |
| 3,754,433 | 8/1973 | Hyer | 73/37.6 |
| 3,976,270 | 8/1976 | Catchpole | 73/37 X |

*Primary Examiner*—Richard C. Queisser
*Assistant Examiner*—Joseph W. Roskos
*Attorney, Agent, or Firm*—Kane, Dalsimer, Kane, Sullivan and Kurucz

[57] ABSTRACT

Apparatus for indicating rate of ice accretion particularly for use in an aircraft, the apparatus including test surface on which ice forms in use. First and second gas conduits are supplied with gas from a common pressure regulator the inlet of which communicates with a gas supply. A control port of the regulator is supplied with a reference pressure signal and the regulator operates to maintain its outlet pressure at a predetermined amount in excess of the reference pressure. Each of the first and second conduits includes a restrictor and each conduit terminates at its end remote from the regulator in an orifice. The first orifice is adjacent the test surface and a pressure difference sensor is associated with the first and second conduits to produce a signal dependent on the pressure difference at points between the orifice and restrictor of the two conduits. The pressure difference signal is applied to an indicator. A control conduit at a point which is intermediate the orifice and the restrictor of the second conduit so that the reference pressure for the regulator is derived from the second conduit between the restrictor and the orifice thereof. The test surface is moved relative to the first orifice at a predetermined speed and thus the first orifice will be restricted to an amount dependent upon the thickness of ice forming on the test surface. The difference in pressure sensed by the sensor is directly related to the thickness of the ice layer on the test surface, and since the test surface is moving at a predetermined speed then the indicator indicates the rate of ice accretion on the test surface.

2 Claims, 1 Drawing Figure

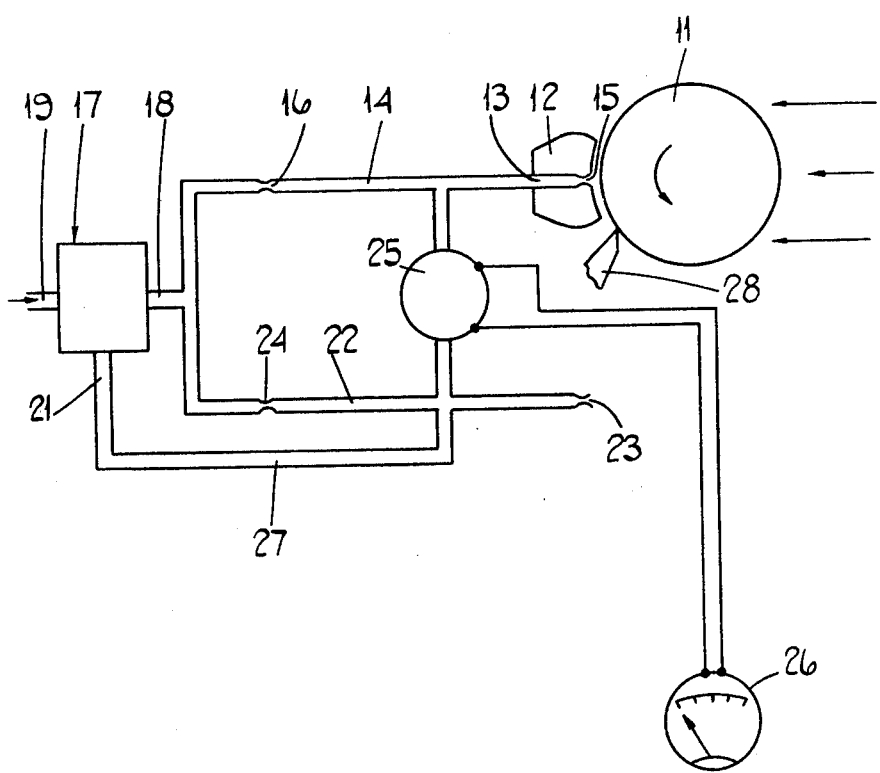

APPARATUS FOR INDICATING RATE OF ICE ACCRETION

This invention relates to apparatus for indicating rate of ice accretion and is particularly intended for use in aircraft.

Apparatus according to the invention includes test surface upon which ice forms in use, first and second gas conduits each communicating at one end with the outlet of a gas pressure regulator the inlet of which communicates with a gas supply, and the regulator having a control port whereby the regulator is supplied with a reference pressure, the regulator operating to maintain its outlet pressure at a predetermined amount in excess of the reference pressure, first and second restrictors in said first and second conduits respectively, said first and second conduits terminating at their ends remote from the regulator, in first and second orifices respectively, said first orifice being adjacent, and presented to, the test surface, means sensing difference in the pressure in the first and second conduits intermediate their orifice and their restrictor respectively and supplying a signal dependent upon such pressure difference to an indicator to operate the indicator, a control conduit connecting the control port of the regulator to the second conduit at a point intermediate the second orifice and the second restrictor whereby the reference pressure for the regulator is the pressure existing in the second conduit intermediate the second restrictor and the second orifice and, means for moving the test surface relative to the first orifice at a predetermined speed, the arrangement being such that when no ice is present on the test surface then the first orifice is unrestricted, and there is no pressure difference between the first and second conduits but when ice forms on the test surface the ice obstructs the first orifice to an extent dependent upon the thickness of the ice layer on the test surface thus resulting in an increase in pressure in the first conduit downstream of the first restrictor related to the thickness of the ice layer on the test surface, the difference in pressure between the first and second conduits being sensed by the sensor, and since the pressure difference is directly related to the thickness of the ice layer on the moving test surface, the indicator thus indicating the rate of ice accretion.

Preferably the test surface is a cylinder which is rotated at a known speed, said first orifice being adjacent to and presented to the cylindrical surface of the cylinder and the cylinder having associated therewith means for continuously removing ice from the test surface as the test surface has moved past the first orifice.

The accompanying drawing is a diagrammatic representation of apparatus in accordance with one example of the invention.

Referring to the drawing, the apparatus for indicating rate of ice accretion includes a small wing-like nacelle of airfoil cross-section (not shown) which protrudes from the fuselage of the aircraft and is positioned such that conditions at the leading edge of the nacelle will be related to conditions at the regions of the surface of the aircraft where it is important to know the rate of ice accretion. The surfaces may for example be the leading edges of wings, or the air intakes for the engines of the aircraft. The leading edge of the nacelle is formed with an aperture within which is exposed part of the surface of a cylinder 11, the cylinder 11 being of circular cross-section and being rotatable about its longitudinal axis at a predetermined constant speed by a drive arrangement (not shown). The surface of the cylinder 11 constitutes an endless test surface and rotation of the cylinder causes the cylindrical surface continually to be exposed to the air flow over the leading edge of the nacelle. Thus the surface of the cylinder 11 will, in flight, be subject to atmospheric conditions related to the atmospheric conditions found on the regions of the aircraft surfaces which it is important to know the rate of ice accretion. If the atmospheric conditions are such that ice would form on the regions in question, ice will form similarly, and at a related rate, on the surface of the cylinder 11 passing through the zone of ice accretion defined by the aperture in the nacelle.

Within the nacelle is positioned a metal block having a part cylindrical surface coaxial with, and spaced from the cylindrical surface of the cylinder 11. The block 12 is formed with a through bore 13 defining an extension of a first conduit 14 which terminates at the part cylindrical surface of the block 12 in an orifice 15. The orifice 15 is thus adjacent, and presented to the test surface, and is spaced therefrom by a predetermined distance. Spaced along the conduit 14 from the orifice 15 is a restrictor 16 and on the side of the restrictor 16 remote from the orifice 15 the conduit 14 communicates with the outlet 18 of a pressure regulator 17. The pressure regulator 17 is of known form, and may for example be a Fairchild Differential Pressure Regulator manufactured and sold by Fairchild Industrial Products Division and known as their Model 59. The pressure regulator includes an inlet 19 which is connected to a supply of clean, filtered air under pressure, conveniently from the conventional air pressure system of the aircraft. In addition the regulator includes a control port 21 whereby a reference pressure is applied to the regulator. The operation of the regulator basically is to ensure that the pressure at the outlet 18 is always a predetermined amount in excess of the pressure at the control port 21. It is of course essential that the pressure at the main inlet 19 is in excess of the maximum required pressure at the outlet 18. The Fairchild Regulator mentioned above is adjustable and in this case is so set as to ensure that the pressure at the outlet 18 is always three pounds per square inch in excess of the control pressure applied at the control port 21.

The regulator outlet 18 also communicates with a second conduit 22, the conduit 22 terminating at its end remote from the regulator 17 in an orifice 23 of dimensions such that it establishes a pressure drop similar to that across the orifice 15 when the orifice 15 is unrestricted by ice, that is to say the inherent pressure drop across the orifice 15. Moreover, intermediate the orifice 23 and the regulator outlet 18 the conduit 22 includes a restrictor 24 of dimensions similar to the dimensions of the restrictor 16 of the conduit 14.

A pressure sensor 25 communicates with the conduits 14, 22 intermediate their orifices 15, 23 and their restrictors 16, 24 and thus will sense any difference between the pressure in the conduit 14 intermediate the restrictor 16 and orifice 15 and the pressure in the conduit 22 between the restrictor 24 and the orifice 23. The sensor 25 produces an output signal which is dependent upon the pressure difference sensed by the sensor and the signal is applied to an indicator 26 to operate the indicator 26. The nature of the output signal of the sensor 25 will be dependent upon the nature of the indicator 26. However, it is preferred to use a simple electrical meter as the indicator 26, and thus the sensor 25 is arranged to produce an electrical output signal suitable to operate the meter. The meter constituting the indicator 26 will be positioned remote from the sensor 25, for example on the control panel of the aircraft, and if the sensor 25 produces only small electrical signals then it may be desirable to include means for amplifying the output signal before it is supplied to the indicator 26. It will be understood that the restrictors 16, 24 and the orifices 15, 23 need not be identical. However it is desirable that the restrictors and orifices are so related that ratio of the pressure drops across the restrictor 16 and the orifice 15 in the ice free, that is to say unrestricted, condition of the orifice 15, is equal to the ratio of the pressure drops across the restrictor 24 and orifice 23. The equilization of the ratios of pressure drops simplifies the setting-up of the sensor and indicator of the system in that it facilitates the achievement of a reliably repeatable zero position and furthermore ensures an operating response approaching linearity so that a substantially linear scale can be provided on the indicator 26.

A further conduit 27 is connected at one end to the control port 21 of the regulator, and is connected at its other end to a point in the conduit 22 intermediate the orifice 23 and the restrictor 24. Thus the control pressure for the regulator 17 is derived from the conduit 22, so that a constant pressure difference is maintained across the restrictor 24.

Adjacent the block 12 there is provided a scraper blade 28 which is positioned closely adjacent, or actually bears lightly on, the test surface of the cylinder 11. The function of the blade 28 is to remove any ice which has formed on the test surface when the test surface has moved past the orifice 15. Thus assuming a layer of ice has formed on the test surface then the layer of ice will pass in front of the orifice 15 and then will be removed by the blade 28 so that the test surface is cleaned in readiness to pass again through the aperture of the nacelle where, provided icing conditions remain, a further ice layer will form and will be carried back on the test surface to pass the orifice 15.

The operation of the system is as follows. Clean, dry, filtered air under pressure is supplied to the regulator 17 from a convenient source such as the conventional air pressure system of the aircraft. The pressure supplied to the inlet 19 of the regulator is in excess of the maximum pressure required at the outlet 18 of the regulator, and the regulator operates to ensure that the pressure at the outlet 18 is constantly at a convenient value for example, 3 pounds per square inch in excess of the pressure in the conduit 22 intermediate the orifice 23 and the restrictor 24, regardless of the pressure in the conduit 22. In the event that no ice forms on the test surface then the gap between the orifice 15 and the test surface of the cylinder 11 is such that the orifice 15 is unrestricted that is to say exhibits only its own inherent restriction. As the orifice 15 and the orifice 23 produce equal pressure drops in this condition provided that the restrictors 16, 24 are correctly sized then the pressure in the conduit 14 will be equal to the pressure in the conduit 22 and there will be no pressure difference to be sensed by the sensor 25. Under these conditions the indicator 26 is arranged to read zero.

The other extreme condition is when the ice thickness on the test surface cylinder 11 fully closes the gap and reduces the flow in conduit 14 to zero. Under this condition there is no pressure drop across restrictor 16, thus the sensor 25 experiences the full pressure drop across restrictor 24 which is maintained constant regardless of ambient atmospheric pressure by the regulator 17, and the sensor provides a signal corresponding to full scale deflection on indicator 26.

As will be explained more fully hereinafter the meter constituting the indicator 26 is calibrated with a scale representing rate of ice accretion on the cylindrical, test surface of the cylinder 11. When the aircraft flies into atmospheric conditions which will give rise to icing then ice will form on the test surface of the cylinder 11 and the thickness of the layer of ice which forms will be dependent upon the severity of the icing conditions. Since the cylinder 11 is rotating at a known speed then the thickness of the layer of ice which forms in a given period of time on the test surface is representative of the rate of ice accretion on the test surface. As stated above, the rate of ice accretion on the test surface will bear a known relation to the rate of ice accretion on the regions of the aircraft where it is important to know the rate of ice accretion.

Any ice which forms on the test surface will be moved across the orifice 15 by the rotation of the cylinder 11, and thus will restrict the orifice 15 to an amount dependent upon the thickness of the ice layer. A restriction of the orifice 15 will give rise to an increase in the pressure in the conduit 14 intermediate the orifice 15 and the restrictor 16. However, there will not of course be a similar restriction of the orifice 23 and so the pressure in the conduit 22 will not alter. Thus the sensor 25 will sense a pressure difference between the conduits 14, 22 the pressure difference being directly related to the degree of restriction of the orifice 15, and thus being directly related to the thickness of the ice layer on the test surface. It follows therefore that the indicator 26 will give a reading which is directly related to the rate of ice accretion, and provided the relationship is first established then the scale of the indicator 26 can be calibrated in terms of rate of ice accretion.

Since the test conduit 14, and the reference conduit 22 are supplied with air from a common source, namely the outlet of the regulator 18, then fluctuations in supply pressure will not alter the pressure difference between the two conduits, and so will not affect the reading of the indicator 26. Moreover, by utilizing the pressure in the conduit 22 intermediate the orifice 23 and the restrictor 24 as the reference pressure for controlling the regulator 17, the apparatus is insulated from the effects of variations in external atmospheric pressure. It will be understood that variations in external atmospheric pressure can arise either from barometric changes, or from altitude changes. Thus the reading of rate of ice accretion given by the indicator 26 is totally independent of both supply, and atmospheric pressure variations.

It will be understood that alternative forms of regulator can be utilized if desired, and that other forms of ice removal, other than the blade 28, could be utilized if desired. For example, the blade 28 could be replaced by a rotating cutter, or some form of localized heating means. Moreover, the cylindrical endless test surface could if desired be replaced by the plane surface of a rotating disc, or could be replaced by the surface of an elongate wire, or ribbon moved at a known speed past the orifice 15. In the case of a wire or ribbon, it is probable that no ice removal means would be required since sufficient length of wire or ribbon could be provided for the apparatus to function for the duration of a flight without the same region of the wire or ribbon being required to pass the orifice 15 for a second time.

Whatever the nature of the test surface chosen it will be appreciated that if desired the drive mechanism for the test surface can be arranged to be selectively operable at two or more predetermined speeds, the indicator 26 having an appropriate equivalent number of scales thereon. Thus in very light icing conductions the pilot would select the slow movement of the test surface thus giving time for a substantial thickness of ice to be built up on the test surface before passing the orifice 15. On the other hand in heavy icing conditions where the ice layer would for example be thicker than the gap between the block 12 and the test surface then the pilot, or an automatic signal device sensitive to a full scale reading of the indicator 26, would select a faster speed of movement of the test surface, and in each case the observer would read the rate of ice accretion from the appropriate scale of the indicator.

I claim:

1. Apparatus for indicating rate of ice accretion comprising test surface upon which ice forms in use, first and second gas conduits each communicating at one end with the outlet of a gas pressure regulator the inlet of which communicates with a gas supply, and the regulator having a control port whereby the regulator is supplied with a reference pressure, the regulator operating to maintain its outlet pressure at a predetermined amount in excess of the reference pressure, first and second restrictors in said first and second conduits respectively, said first and second conduits terminating at their ends remote from the regulator in first and second orifices respectively, said first orifice being adjacent, and presented to, the test surface, means sensing difference in the pressure in the first and second conduits intermediate their orifice and their restrictor respectively and supplying a signal dependent upon such pressure difference to an indicator to operate the indicator, a control conduit connecting the control port of the regulator to the second conduit at a point intermediate the second orifice and the second restrictor whereby the reference pressure for the regulator is the pressure existing in the second conduit intermediate the second restrictor and the second orifice and, means for moving the test surface relative to the first orifice at a predetermined speed, the arrangement being such that when no ice is present on the test surface then the first orifice is unrestricted, and there is no pressure difference between the first and second conduits but when ice forms on the test surface the ice obstructs the first orifice to an extent dependent upon the thickness of the ice layer on the test surface thus resulting in an increase in pressure in the first conduit downstream of the first restrictor related to the thickness of the ice layer on the test surface, the difference in pressure between the first and second conduits being sensed by the sensor, and since the pressure difference is directly related to the thickness of the ice layer on the moving test surface the indicator thus indicating the rate of ice accretion.

2. Apparatus as claimed in claim 1 wherein the test surface is a cylinder which is rotated at a known speed, said first orifice being adjacent to and presented to the cylindrical surface of the cylinder and the cylinder having associated therewith means for continuously removing ice from the test surface as the test surface has moved past the first orifice.

* * * * *